MICROWAVE APPARATUS

Filed May 8, 1956 2 Sheets-Sheet 1

July 17, 1962 R. T. A. HOWELL ETAL 3,045,188

MICROWAVE APPARATUS

Filed May 8, 1956 2 Sheets-Sheet 2

INVENTORS
RONALD THOMAS HOWELL ET AL.

By Mawhinney & Mawhinney
ATTORNEYS

United States Patent Office 3,045,188

Patented July 17, 1962

3,045,188

MICROWAVE APPARATUS

Ronald Thomas Albert Howell and Leo Young, London, England, assignors to Decca Limited, London, England, a British company Filed May 8, 1956, Ser. No. 583,481
3 Claims. (Cl. 329—161)

Figure 1:
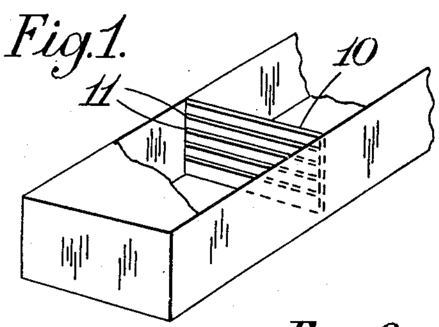

This invention relates to microwave apparatus and in particular to apparatus which includes a waveguide or other surface wave transmission system or a cavity or other bounded portion containing an electric microwave frequency field and has for one of its objects to provide improved means for adjusting the effective electrical dimensions of such a transmission system, cavity or other bounded portion.

The invention makes use of the property that the dielectric constant of certain ceramic dielectric materials, notably the high dielectric constant ceramic materials containing as their principal constituent barium titanate or certain other titanates and containing also certain metallic oxides (to reduce the loss angle at micro-wave frequencies), can be controlled by an applied electric potential gradient established within the material. For convenience such solid dielectric materials in which the dielectric constant can be controlled by an applied electric potential gradient will be described hereinafter as dielectric materials of the kind referred to. The dielectric constant of such material depends only on the potential gradient established in the material and is not affected by the direction of that gradient.

Dielectric material of the kind referred to has a dielectric constant dependent on the magnitude and direction of the applied electric field. Such material may, therefore be disposed in a radio frequency field to provide an output which is non-linear with respect to the incident field.

According to this invention, in microwave apparatus, dielectric material of the kind referred to is arranged in the transmission path of a microwave field so that the input signal is modified along said path due to the variations of dielectric constant under the influence of the incident field, and means are provided for selectively extracting, from the modified signal, a component of a different frequency from that of the input signal.

By employing this invention, it is possible to construct a rectifier or a radio frequency mixer or a harmonic generator in which dielectric material of the kind referred to is utilised to provide the required non-linearity of response to an incident radio frequency field.

One construction of microwave harmonic generator employing the invention comprises a waveguide containing dielectric material of the kind referred to and matching means on either side thereof, which waveguide is coupled at one end to a source of microwave frequency oscillations and is coupled at the other end to means for selectively passing the required harmonic component or components. Since the dielectric constant of the material will vary according to the amplitude of the field but is independent of the direction thereof in the absence of any biasing potential, the output will be distorted and will, in particular, contain a high proportion of the second harmonic component. The means for selectively passing the harmonic component or components in a typical case may comprise a waveguide of dimensions such as to act as a cut-off attenuator for the unwanted frequencies.

The electric potential applied to the material may be provided by the microwave frequency field present within the apparatus or by that field together with an external control potential. In this latter case, it will be appreciated that the direction of the external potential with respect to the microwave frequency field may have to be taken into consideration.

A microwave detector or mixer may comprise a waveguide containing dielectric material of the kind referred to for applying a biasing electric potential to the dielectric material, matching means in said waveguide on one side of said dielectric material and a modulation or beat frequency extracting device on the other side of said dielectric material for selectively extracting a signal of the required modulation or beat frequency. Due to the biasing potential, the distortion of the field will be different on positive and negative half-cycles of the radio frequency energy and thus the required modulation or beat frequency component will be present in the output. The modulation or beat frequency extracting device may comprise a probe extending into said waveguide, which probe may be coupled to a coaxial line in the known manner.

It will in general be necessary to provide matching means for matching the impedance of the part of the apparatus containing the dielectric material to the incident radio frequency field. Many forms of matching devices for use in microwave apparatus are known and suitable constructions to meet any particular requirement will generally be readily apparent. In a tunable cavity or line the matching means may, for example, comprise one or more pieces of material having a dielectric constant of a value or values intermediate between the constants of the regions to be matched. Materials of such dielectric constants may readily be made by powdering the dielectric material of the kind referred to above and mixing it in polyfoam or other suitable diluting plastic material. Only one piece of material with an intermediate dielectric constant might be used but in general better matching will be obtained by employing a graded series of elements arranged in order of their dielectric constants which would be suitably chosen in accordance with the dimensions of the elements.

As is also known, matching in a tunable cavity or line may be effected by shaping dielectric material to have a section which varies along the length of the cavity or line. For example, matching elements may be formed by shaping material in the form of a wedge or inverse wedge for a rectangular cavity or waveguide or in the form of a cone or inverse cone for a cavity or line of circular section. The material to which the electric potential is applied may be shaped in this manner. As previously explained the dielectric constant depends on the potential gradient and thus the constant will only be variable in the region where the applied variable gradient exists and hence the matching means can be formed integrally with the material to which the potential is applied without affecting the performance of the latter. Alternatively, a separate piece of dielectric material, either high constant material of the kind referred to or of lower constant, may be suitably shaped to form a matching device and, if desired, this may be combined with a series of elements having intermediate dielectric constants.

Although matching has been referred to more specifically with reference to a tunable cavity or line, similar techniques may be employed in other apparatus where matching to the region occupied by the material of the kind referred to is necessary.

It is necessary to have quite a high potential gradient for most purposes, for example a gradient of two kilovolts per millimetre may be required. If an external potential is to be used, the potential will generally be applied to the material between two electrodes and in order to minimize the potential required, the electrodes must be close together. This is normally the major factor in determining the position of the electrodes on the material. Because of the very high dielectric constant of the material, there would be a very large potential drop between an electrode and the material if the electrode were not in intimate contact with the material. To obtain the required close contact, the electrode may be formed of conducting material such as a metal, for example silver, platinum, etc., which is fired onto the dielectric. Conductive material alternatively may be painted on to the surface by applying the material in a suitable medium, for example colloidal graphite in a carrying medium. Silver may be deposited on the surface by a chemical deposition process in which the silver is deposited by the result of chemical action between two compounds which are sprayed on to the surface successively. Some metals such as copper or silver can be sprayed on directly.

One convenient way of arranging the two electrodes is to have such conducting surfaces on opposite sides of a thin sheet of the dielectric material. It will be apparent, however, that it will not generally be possible to put dielectric material having conducting surfaces in a waveguide or other transmission system with these surfaces extending substantially wholly across the incident field since the conducting surfaces would then form short-circuits. To overcome this difficulty, the conducting surfaces on the dielectric material may be made in the form of a strip or a series of strips, which strip or strips are arranged at right angles to the electric vector of the incident field. Thus, for example, in a rectangular waveguide each electrode might comprise a series of parallel strips arranged parallel to the broad face of the guide. The two electrodes may be arranged on one face of the dielectric material by using alternate strips of conducting material for each electrode.

Another manner of applying the potential to the dielectric material is by using ionized gas as a conducting medium. In this case, each electrode would be constituted of ionized gas against a face of the dielectric material and the ionization would have to be such that there is effective conduction for the high applied potential. There must, however, be insufficient conductivity to form a short-circuit for the incident field if the ionized gas lies in the path of this field. The ionized gas may be sealed in a chamber adjacent the dielectric material in a known manner, for example in the manner used in the gas switches for T–R circuits of microwave pulse radars.

In some applications, mercury electrodes may be used in a similar manner to ionized gas.

Figure 2:
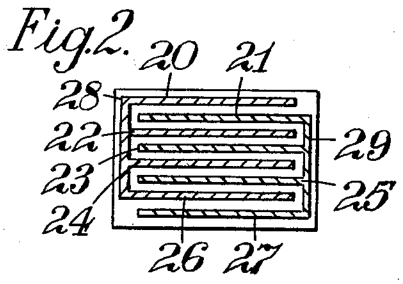
Figure 3:
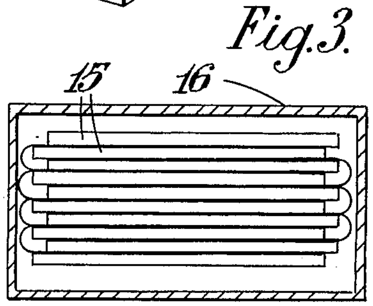
Figure 4:
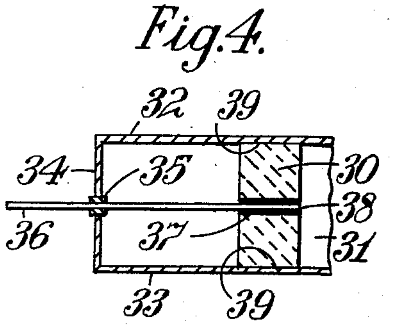
Figure 5:
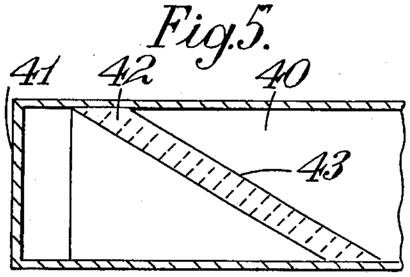
Figure 6:
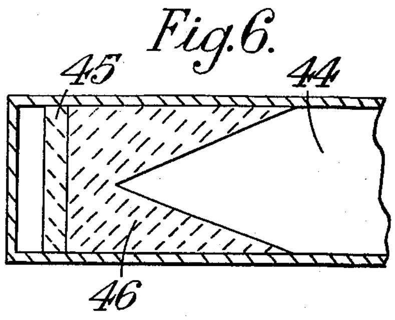
Figure 7:
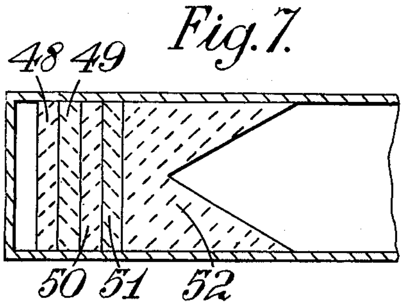
Figure 8:
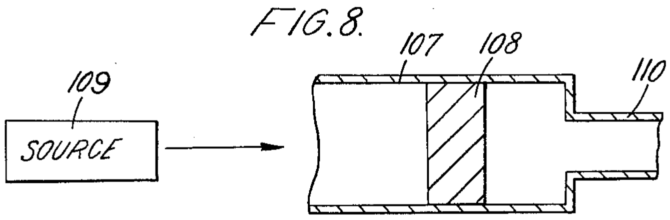
Figure 9:
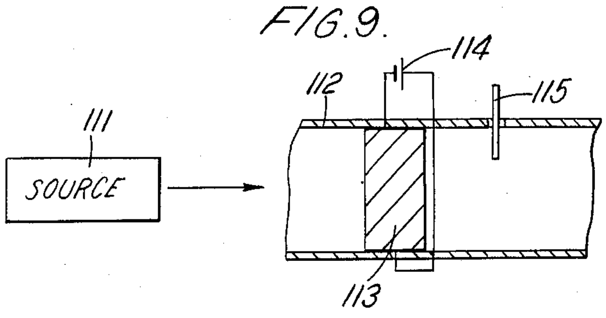
Figure 10:
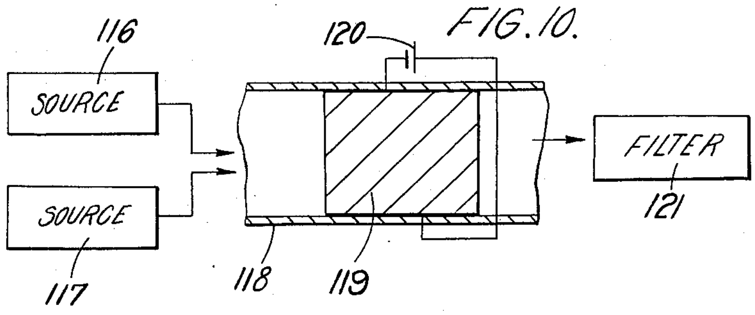

In the following description, reference will be made to the accompanying drawings in which:

FIGURE 1 is a perspective view of a waveguide with part of one face cut away to show the interior construction, FIGURE 2 is a view of one face of a rectangular sheet of dielectric material showing the arrangement of two electrodes on the surface thereof, FIGURE 3 is a transverse section of a waveguide, FIGURE 4 is a longitudinal section through part of a short-circuited waveguide, FIGURES 5, 6 and 7 are also longitudinal sections through short-circuited waveguides showing various matching arrangements, FIGURE 8 is a sectional view of a harmonic generator, FIGURE 9 is a block diagram of a detector, and FIGURE 10 is a block diagram of a mixer.

As explained above, an external control potential may be applied to dielectric material in some embodiments of the invention and for convenience, consideration will be given firstly in the following description to the methods of applying such an external control potential. The method of applying the control potential to the dielectric material will depend to a large extent on the nature of the apparatus in which the material is to be employed. If the material is to be arranged as a thin sheet extending across a rectangular waveguide as shown in FIGURE 1, which is a perspective view of a waveguide with part of the broad face cut away to show the interior, a sheet 10 of the dielectric material may be provided with a series of strips 11 of silver or other suitable metal fired onto the surface of the dielectric. Two sets of such strips may be provided, one on each of the two opposite faces of the dielectric material, and the electric control potential may be applied to these strips by leads (not shown) passing through suitable bushings in the waveguide wall. By arranging the electrodes on opposite sides of the dielectric material, this material prevents any possibility of sparking or breakdown between the electrodes due to ionization of the surrounding air or other gas.

In some circumstances, however, it will be preferable to have both electrodes on one face of the dielectric material and in this case they may be arranged as shown in FIGURE 2 in which the conducting material (shown with hatching for clarity) is arranged as a series of parallel strips 20–27 with alternate strips, such as strips 20, 22, 24 and 26, connected together on one side as indicated at 28 to form one electrode and the remaining strips 21, 23, 25 and 27 connected together at the other side as indicated at 29 to form the second electrode.

In both FIGURES 1 and 2 the strips are illustrated as being parallel to the broad face of the waveguide. It will be appreciated that they must be arranged at right angles to the electric vector of the field in the waveguide in order to prevent them presenting a short-circuit to the incident field. Bearing this consideration in mind the form of strips for use in other applications would be readily apparent.

Another electrode construction for a rectangular waveguide is illustrated in FIGURE 3 which shows a transverse section of a waveguide with a sandwich arrangement of slabs 15 of the dielectric material lying parallel to the broad face 16 of the guide so as to have their sandwich surfaces perpendicular to the electric vector. These surfaces are made conductive by suitable material on both sides of each slab as shown by the heavy lines in the figure. The slabs 15 are staggered slightly and a small strip is left non-conductive at one end of each face of the material, these non-conductive portions being on opposite sides on opposite faces so that on each side of the guide, only one conductive layer on alternate strips is exposed. The connections to alternate conductive layers of the sandwich are made at either side of the waveguide and this staggered arrangement facilitates the making of connections. Such an arrangement enables a relatively low applied potential to be employed since the layers of dielectric material can readily be made very thin. The interconnections between the conductive layers are made at the sides of the guide where the electric field is small and hence the interconnecting links will not short-circuit the guide.

In order to avoid sparking or breakdowns between the electrodes and the walls of the waveguide, it is preferable in an arrangement such as is shown in FIGURE 1 to apply potentials to the two electrodes which are equal and opposite with respect to the potential of the waveguide, which would normally be earthed.

FIGURE 4 shows another method of applying a potential to the dielectric material which is particularly convenient when the latter is arranged close to the end of a short-circuited waveguide. In this figure the dielectric material 30 extends across the waveguide 31 between the faces 32, 33, this waveguide being terminated by a short-circuiting termination 34. An insulating bushing 35 is provided in the centre of the termination 34 and through this bushing extends a lead 36 to which the required high voltage is applied. This lead 36 is soldered or otherwise secured in electrical contact with a metallic coating 37 formed in a central bore 38 through the block of dielectric material. The outer edge of the dielectric material 30 is also provided with a metallic coating 39 which is electrically connected to the waveguide walls 32, 33 so that the requisite potential gradient can be established in the material 30 by applying a suitable potential between the lead 36 and the waveguide structure. The arrangement of FIGURE 4 is particularly suitable for circular waveguides since it avoids any radially extending conducting material, which would act as a short-circuit to a field having a radial electric vector.

Another method of applying the potential to the dielectric material is by arranging chambers of ionized gas on either side of the dielectric material with conducting electrodes extending respectively into the two chambers. These electrodes are connected to the source of control potential which is thus applied to the dielectric material through the ionized gas in the chambers. If these chambers are arranged within the length of the waveguide, then their ionization must be carefully controlled so as to ensure that it is sufficient to enable the control potential to be applied to the dielectric material but is not so great as to act as a short-circuit for the incident radio frequency field.

Yet another method of applying the potential to the dielectric field is by means of mercury electrodes, that is to say, with pools of mercury forming the contacts to the dielectric material.

It will be readily apparent from the foregoing that there are many possible constructions by which a control potential may be applied to the dielectric material in microwave apparatus and, in the light of the foregoing, suitable methods will be readily apparent for any of the forms of apparatus hereinafter described.

The dielectric material of the kind referred to has a very high dielectric constant which may be of the order of many thousands, and if this material is put across a waveguide there will almost invariably be a serious mismatch unless steps are taken to match the impedance of the part of the guide containing the dielectric to the remainder of the guide. Such matching may be effected by using known matching techniques such as, for example, the arrangement shown in FIGURE 5 which shows a length of waveguide 40 terminated in a short-circuit 41 and having a slab of dielectric material 42 of the kind referred to extending across the guide at a point near the short-circuit, the slab sloping in the lengthwise direction of the guide. The face of the dielectric material directed towards the incident radio frequency energy has, in this manner, a sloping surface 43 so that the impedance of the guide gradually changes. In FIGURE 6 there is shown another construction of short-circuited rectangular waveguide 44 containing a sheet of dielectric material 45, this material being the material of the kind referred to and having a very high dielectric constant. In front of this material there is arranged a matching element formed of material having a dielectric constant which is intermediate between that of the element 45 and that of the unfilled portion of the waveguide 44. This material is shaped as an inverse wedge so as to provide the required gradual change of the impedance along the guide in the direction towards the material 45. As shown in FIGURE 7, which also shows a short-circuited rectangular waveguide, a sheet 48 of dielectric material of the kind referred to may be arranged across the guide with a series of elements of material having lower dielectric constants arranged in front of it as, for example, the elements 49, 50 and 51. An inverse wedge 52 is provided as the final element of the matching system. In an arrangement such as FIGURE 7, the dielectric constants of the various elements would be chosen in accordance with the thickness of the various elements and they would be arranged in ascending order towards the element 48. The wedge 52 might be made, for example, of the material known under the registered trademark "Distrene." The remaining elements would have to have substantially higher dielectric constants and they may conveniently be made by powdering dielectric material of the kind referred to and mixing the powder in a thermoplastic such as "Polyfoam." Such a process enables material of any desired dielectric constant intermediate between that of the material 48 and that of the basic thermo-plastic material to be readily produced. In the case of circular waveguides, cones or inverse cones would be used for matching instead of wedges or inverse wedges.

From the foregoing it will be seen that matching may be effected by using known principles. It will be clear that these principles may readily be applied to cases where the dielectric material is used in apparatus other than waveguides or transmission lines and in the following description of specific examples of the invention, for the sake of clarity, reference to the various possible types of matching devices for each individual application of the invention will be omitted.

In the present invention, use is made of the behaviour of the dielectric material of the kind referred to under the influence of a radio frequency field. The radio frequency field provides a potential gradient in the material which varies during each cycle of the radio frequency. This variation in potential gradient causes a variation in the dielectric constant and hence if a block of dielectric material 108 of the kind referred to is put in a waveguide 107 as illustrated in FIGURE 8 and a strong signal is fed into the waveguide, from a source 109, the output will be distorted. Such distortion may be used in a harmonic generator and in this case the distorted output signal may be fed to a filter for selecting the required harmonics. For example, the signal may be fed to a waveguide 110 of smaller dimensions which will act as a cut-off attenuator for the fundamental frequency so thereby only passing the harmonic frequency components of the distorted output. Since the change in dielectric constant of the material is independent of the direction of the electric field, an arrangement such as has just been described with a simple block of the material in the waveguide will produce equal distortion on opposite half-cycles of the incident field. If, however, a bias voltage is applied to the material, then the distortion will be different on the opposite half-cycles of the incident field and the arrangement may conveniently be used as a detector for detecting modulation in a modulated signal as shown in FIGURE 9 where signals from a source 111 are applied to a waveguide 112 containing dielectric material 113 to which a biasing voltage is applied from a source indicated diagrammatically as a battery 114. The incident signals will be distorted and the modulation signal may be extracted by means of a probe 115 extending into the waveguide 112 behind the dielectric material 113. FIGURE 10 illustrates a mixer in which two microwave frequency signals from sources 116, 117 are fed into a waveguide 118 containing a block dielectric material 119. A biasing voltage is applied to this dielectric material by means indicated diagrammatically as a battery 120. The dielectric material will introduce distortion so producing a beat frequency which may be extracted, if the frequency is low enough by a probe such as shown in FIGURE 9 or by a filter 121 as shown in FIGURE 10.

We claim:

1. A microwave detector comprising a wave guide having an input and an output, means coupling said input to a source of modulated microwave signals of which the modulation is to be detected, dielectric material of the kind in which the dielectric constant depends on an applied electric potential arranged in said wave guide so that the dielectric constant is varied by the applied signals from said source, means for applying a biasing electric potential to said material, and means coupled to said output for selectively extracting a signal of the required modulation frequency.

2. A microwave detector as claimed in claim 1 wherein the means for selectively extracting the modulation frequency comprises a probe extending into said wave guide.

3. A microwave detector as claimed in claim 1 and having matching means in said waveguide on the input side of said dielectric material for matching the part of the guide with the material to the input part of the guide.

References Cited in the file of this patent

UNITED STATES PATENTS

| | | |
|---|---|---|
| 1,998,119 | Cox | Apr. 16, 1935 |
| 2,191,315 | Guanella | Feb. 20, 1940 |
| 2,443,094 | Carlson et al. | June 8, 1948 |
| 2,460,109 | Southworth | Jan. 25, 1949 |
| 2,532,157 | Evans | Nov. 28, 1950 |
| 2,607,031 | Denis et al. | Aug. 12, 1952 |
| 2,646,550 | Varela | July 21, 1953 |
| 2,752,495 | Kroger | June 26, 1956 |

FOREIGN PATENTS

| | | |
|---|---|---|
| 142,487 | Australia | July 26, 1951 |
| 451,912 | Italy | Oct. 4, 1949 |